United States Patent
Beyene et al.

(10) Patent No.: US 9,623,875 B2
(45) Date of Patent: Apr. 18, 2017

(54) SYSTEMS AND METHOD FOR DRIVING EVALUATION AND TRAINING

(71) Applicants: University of Pittsburgh—Of the Commonwealth System of Higher Education, Pittsburgh, PA (US); The United States of America as represented by the Department of Veterans Affair, Washington, DC (US)

(72) Inventors: Nahom Minassie Beyene, Pittsburgh, PA (US); Amy Karas Lane, Allison Park, PA (US); Rory Alan Cooper, Gibsonia, PA (US); Joshua D. Brown, Pittsburgh, PA (US)

(73) Assignees: University of Pittsburgh—Of the Commonwealth System of Higher Education, Pittsburgh, PA (US); The United States of America as represented by the Department of Veterans Affairs, Washington, DC (US)

( * ) Notice: Subject to any disclaimer, the term of this patent is extended or adjusted under 35 U.S.C. 154(b) by 0 days.

(21) Appl. No.: 14/738,007

(22) Filed: Jun. 12, 2015

(65) Prior Publication Data
US 2015/0360698 A1 Dec. 17, 2015

Related U.S. Application Data

(60) Provisional application No. 62/011,803, filed on Jun. 13, 2014.

(51) Int. Cl.
*B60W 40/09* (2012.01)
*B60W 50/14* (2012.01)

(52) U.S. Cl.
CPC ............ *B60W 40/09* (2013.01); *B60W 50/14* (2013.01); *B60W 2540/12* (2013.01); *B60W 2540/18* (2013.01)

(58) Field of Classification Search
CPC .... B60W 40/09; B60W 2510/20; G09B 9/052
See application file for complete search history.

(56) References Cited

U.S. PATENT DOCUMENTS

| 5,341,680 A | 8/1994 | Smart |
| 6,925,425 B2 | 8/2005 | Remboski |

(Continued)

FOREIGN PATENT DOCUMENTS

WO WO2008/151942 A2 * 12/2008

OTHER PUBLICATIONS

Amditis, A. et al., Driver—Vehicle—Environment monitoring for on-board driver support systems: Lessons learned from design and implementation, Applied Ergonomics 41 (2010) 225-235.

(Continued)

*Primary Examiner* — Michael J Zanelli
(74) *Attorney, Agent, or Firm* — Bartony & Associates, LLC

(57) ABSTRACT

A system for evaluation of an operator of a vehicle including a steering system under observation of an evaluator within the vehicle includes a steering sensor system adapted to measure intervention of the evaluator in operating the steering system. A method for evaluating vehicle control of a driving entity of a vehicle under observation of an evaluator in the vehicle includes providing at least one sensor system adapted to measure intervention of the evaluator in operating the vehicle.

24 Claims, 8 Drawing Sheets

(56) References Cited

U.S. PATENT DOCUMENTS

| | | | | |
|---|---|---|---|---|
| 8,100,217 | B2* | 1/2012 | Crombez | G05G 1/34 |
| | | | | 180/315 |
| 8,633,985 | B2* | 1/2014 | Haynes | G07C 5/085 |
| | | | | 340/438 |
| 9,056,616 | B1* | 6/2015 | Fields | B60W 50/14 |
| 2006/0200277 | A1 | 9/2006 | Yoshida | |
| 2007/0120691 | A1 | 5/2007 | Braun | |
| 2009/0210257 | A1 | 8/2009 | Chalfant | |
| 2010/0112529 | A1 | 5/2010 | Miura | |
| 2011/0098890 | A1* | 4/2011 | Lee | B62D 1/286 |
| | | | | 701/42 |
| 2011/0106370 | A1 | 5/2011 | Duddle | |
| 2014/0272810 | A1* | 9/2014 | Fields | G09B 19/14 |
| | | | | 434/65 |
| 2015/0353006 | A1* | 12/2015 | Jolda | B60Q 3/0293 |
| | | | | 315/77 |

OTHER PUBLICATIONS

Antin, J., et al. Design of the In-Vehicle Driving Behavior and Crash Risk Study: In Support of the SHRP 2 Naturalistic Driving Study (No. SHRP 2 Report S2-S05-RR-1).

Beyene, Nahom M., Navisection: A Novel Method Joining Naturalistic Driving Data Collection with Expert Witness Event Logging for Enhanced Assessment of Driver Safety, 3rd International Conference on Road Safety and Simulation, Indianapolis IN, Sep. 14-16.

Crizzle, Alex et al., Using In-Vehicle Devices to Examine Exposure and Patterns in Drivers with Parkinson's Disease Compared to an Age-Matched Control Group, Proceedings of the Fifth International Driving Symposium on Human Factors in Driver Assessment, Training and Vehicle Design, Lake Tahoe, CA, 263-269.

Dobbs, Allen R. et al., A comparative Approach to Identify Unsafe Older Drivers, Accid. Anal. and Prev., 1998, vol. 30, No. 3, pp. 363-370.

Dobbs, A. R., Accuracy of the DriveABLE cognitive Assessment to Determine Cognitive Fitness to Drive, Canadian Family Physician, Le Médecin de famille canadien , 2013, vol. 59, 156-161.

Galski, Thomas et al., Estimates of Driving Abilities and Skills in Different Conditions, The American Journal of Occupational Therapy, 1998, Vo. 52, No. 4, 268-275.

Gabler, Hampton C. et al., Feasibility of Using Event Data Recorders to Characterize the Pre-Crash Behaviour of Drivers in Rear-End Collisions, Proceedings of the Twenty-first International Conference on Enhanced Safety of Vehicles, Paper No. 09- 0452, Stuttgart, Germany, pp. 1-8.

Horberry, T. et al., Defining criteria for the functional assessment of driving, Applied Ergonomics, (2010), 41 796-805.

Justiss, Michael D., Development of a Behind-The-Wheel Driving Performance Assessment for Older Adults, 2005, pp. 1-149.

Lotan, T. et al. Evaluating the Safety Implications and Benefits of an In-Vehicle Data Recorder to Young Drivers. Proceedings of the Third International Driving Symposium on Human Factors in Driver Assessment, Training and Vehicle Design (2005), Rockport, Maine, Jun. 27-30, pp. 448-455.

Naito, Atsumi et al., Driver Evaluation Based on Classification of Rapid Decelerating Patterns, In Vehicular Electronics and Safety (ICVES), 2009 IEEE International Conference on IEEE, pp. 108-112.

Neale, Vicki L, et al. An Overview of the 100-Car Naturalistic Study and Findings, 2005, Paper presented at the 19th ESV Conference. Washington, DC, June, pp. 1-10.

Reimer, Bryan et al., Development of a Driver Aware Vehicle for Monitoring, Managing & Motivating Older Operator Behavior, Proceedings of the ITS America, Jun. 2009, pp. 1-9.

* cited by examiner

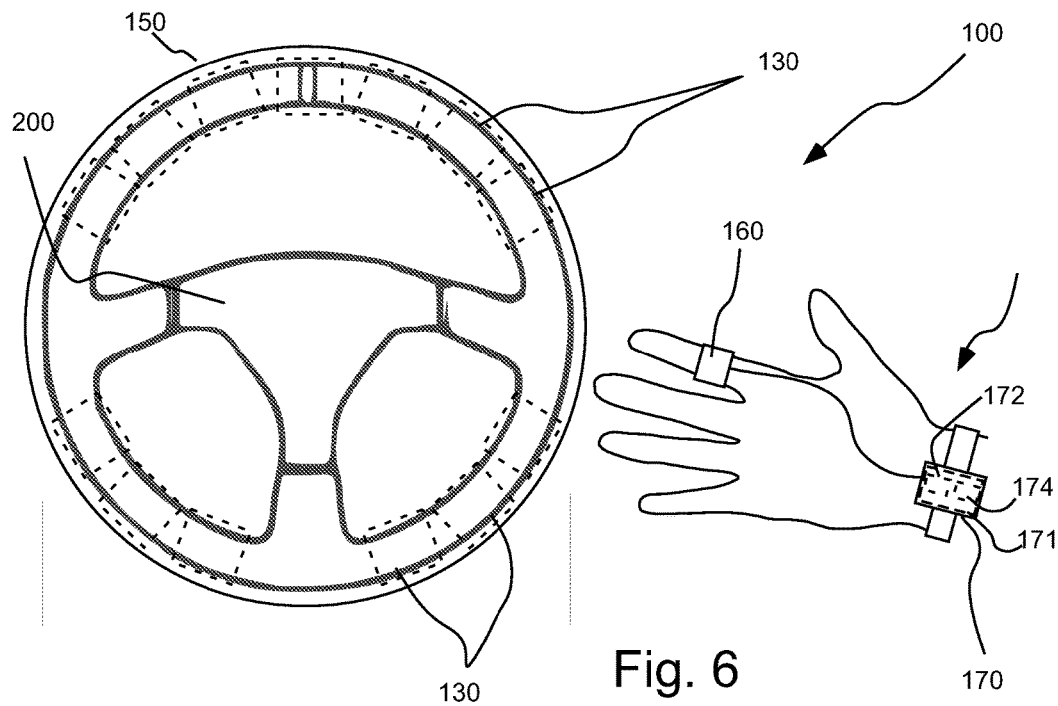
Fig. 6
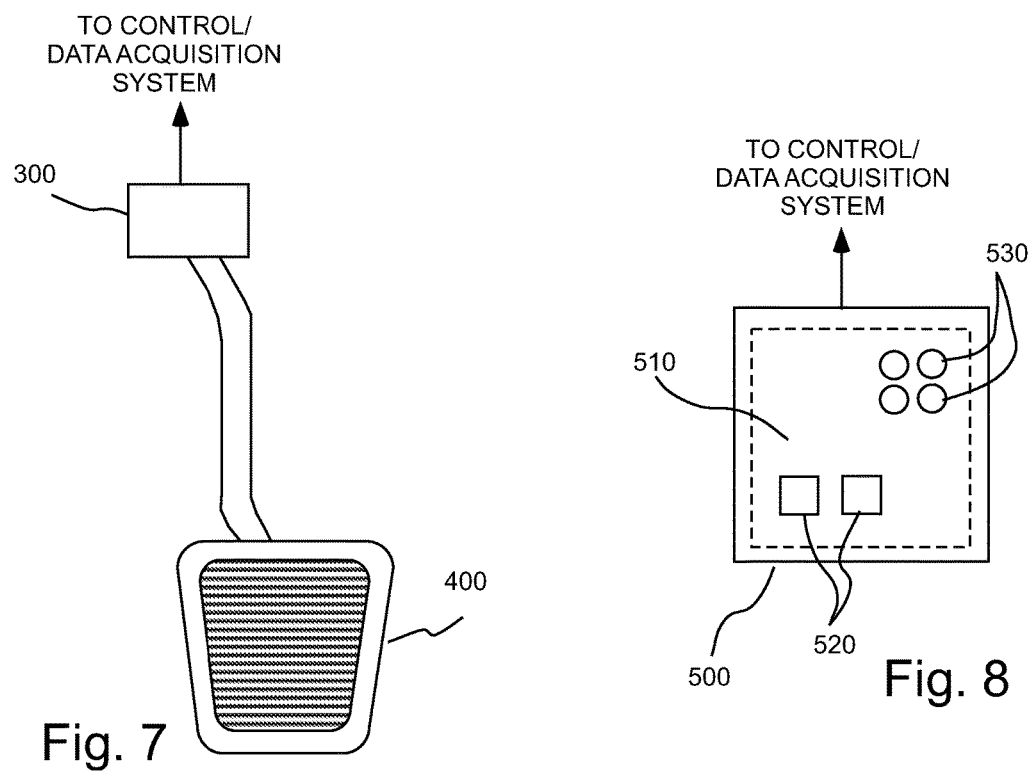
Fig. 7
Fig. 8

SYSTEMS AND METHOD FOR DRIVING EVALUATION AND TRAINING

CROSS-REFERENCE TO RELATED APPLICATIONS

This application claims benefit of U.S. Provisional Patent Application Ser. No. 62/011,803, filed Jun. 13, 2014, the disclosure of which is incorporated herein by reference.

GOVERNMENTAL INTEREST

This invention was made with government support under the National Science Foundation Grant No. 0540865 and 1345368. The government has certain rights in this invention.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

In licensing or activating drivers it is important to fully evaluate the vehicle operator's or driver's capability in controlling an automobile or other motorized vehicle. Evaluation of drivers is important, whether the driver to be evaluated is, for example, a youthful new driver, an older driver or a medically impaired driver. Furthermore, automated control system or systems adapted to assist in control of one or more aspects of a vehicle's operation should be adequately evaluated prior to implementing the system(s). It is very desirable to provide improved systems and methods for evaluating human drivers and automated control systems.

SUMMARY

In one aspect, a system for evaluation of an operator of a vehicle under observation of an evaluator within the vehicle (wherein the vehicle includes a steering system) includes a steering sensor system adapted to measure intervention of the evaluator in operating the steering system. The vehicle may, for example, include at least one secondary control system via which the evaluator may intervene in control of the vehicle. The system may further include a secondary control sensor system to measure intervention of the evaluator via the at least one secondary control system. The vehicle may, for example, further include a braking system, and the secondary control system may include an evaluator brake actuator in operative connection with the braking system. The secondary control sensor system may, for example, include a braking sensor system in operative connection with the evaluator brake actuator which is adapted to measure intervention of the evaluator in operating the evaluator brake actuator.

In a number of embodiments, the system further includes a verbal cue logging system (including, for example, a voice recording system). The verbal cue logging system may, for example, be manually activatable by the evaluator or be automatically activated. The system may, for example, further include a control system in operative connection with the steering sensor system and the braking sensor system. The control system may, for example, include a controller in operative connection with the verbal cue logging system which comprises at least one activatable switch to activate the verbal cue logging system. The system may, for example, further include a data acquisition system in operative connection with the steering sensor system, the braking sensor system and the verbal cue logging system. The system may, for example, further include a processor in communicative connection with the data acquisition system.

In a number of embodiments, the vehicle further comprises at least one automated component adapted to effect driving control. The system method further includes a system to monitor output of the automated component so that the output may, for example, be compared with data of evaluator intervention to evaluate the automated component.

In a number of embodiments, the steering sensor system detects proximity of an evaluator's hand to the steering wheel. The steering sensor system may, for example, include a steering wheel component and an evaluator component which is worn in vicinity of the evaluator's hand. At least one of the steering wheel component and the evaluator component may, for example, create an energy field. In a number of embodiments, at least one of the steering wheel component and the evaluator component includes at least one magnet to create a magnetic field in the vicinity thereof, and the other of the steering wheel component and the evaluator component comprises a sensor reactive to or interactive with the magnetic field. In a number of embodiments, the evaluator component is in wireless communicative connection with the data acquisition system.

In another aspect, a system for evaluation of a vehicle operator in a vehicle under observation of an evaluator in the vehicle, includes at least one sensor system to measure intervention of the evaluator in operating the vehicle. As described above, the vehicle may, for example, include at least one secondary control system via which the evaluator may intervene in control of the vehicle. The system may further include a secondary control sensor system to measure intervention of the evaluator via the at least one secondary control system. The vehicle may, for example, include a braking system including a driver brake actuator and an evaluator brake actuator. The system may, for example, further include a braking sensor system in operative connection with the evaluator brake which is adapted to measure intervention of the evaluator in operating the evaluator brake. In a number of embodiments, the vehicle includes a steering system, and the system further includes a steering sensor system adapted to measure intervention of the evaluator in operating the steering system.

In another aspect, a method for evaluating vehicle control of a driving entity of a vehicle under observation of an evaluator in the vehicle includes providing at least one sensor system adapted to measure intervention of the evaluator in operating the vehicle. The vehicle may, for example, include a steering system, and the method may include providing a steering sensor system adapted to measure intervention of the evaluator in operating the steering system. In a number of embodiments, the vehicle includes a braking system including an evaluator brake actuator, and the method may include providing a braking sensor system in operative connection with the evaluator brake actuator which is adapted to measure intervention of the evaluator in operating the evaluator brake actuator. The method may further include providing a system to log verbal cues given by the evaluator. In a number of embodiment, the method further includes providing a data acquisition system in operative connection with the steering sensor system, the braking sensor system and/or the verbal cue logging system. The vehicle may, for example, include at least one automated component, and the method may further include monitoring output of the automated component and comparing of the output with data of evaluator intervention (for example, from the data acquisition system) to evaluate the automated component.

In a further aspect, proximity sensor system to determine proximity of a person to a location includes a first component which creates an energy field and a second component which reacts or interacts with the energy field when the second component is in a predetermined range of proximity to the first component. One of the first component and the second component is adapted to be worn by a person, and the other of the first component and the second component is adapted to be place in the vicinity of the location. The first component may, for example, be adapted to be worn by a person and the second component may be adapted to be place in the vicinity of the location.

BRIEF DESCRIPTION OF THE DRAWINGS

FIG. 6 illustrates schematically an embodiment of a steering wheel assistance sensor system hereof.

FIG. 7 illustrates schematically an embodiment of a braking assistance sensor system hereof.

FIG. 8 illustrates schematically an embodiment of a verbal cue sensor initiation system hereof.

DESCRIPTION

Figure 1A:
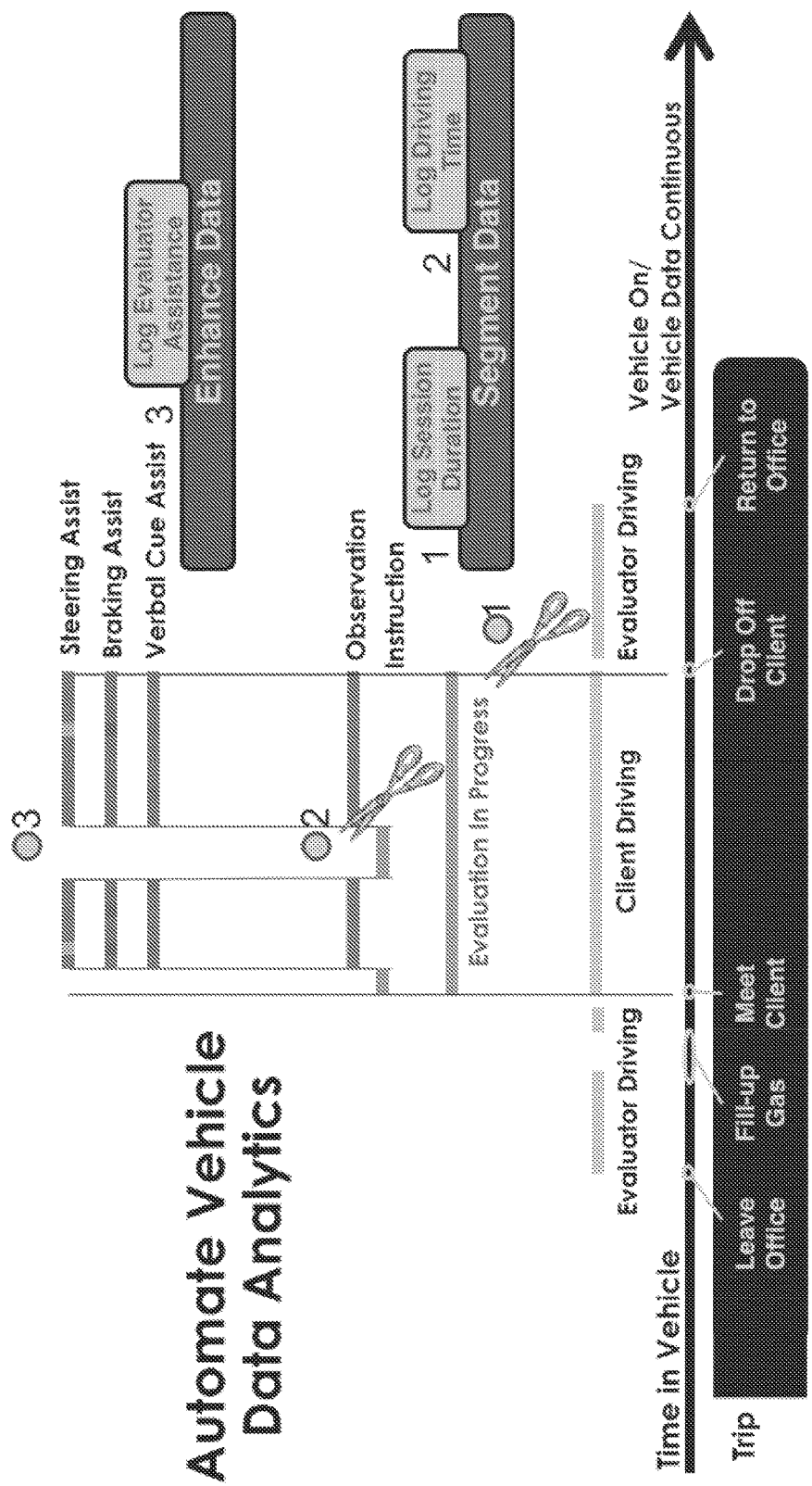
FIG. 1A illustrates an embodiment of a scheme for data segmentation and enhancement.

The present devices, systems, and methods, along with the attributes and attendant advantages thereof, will best be appreciated and understood in view of the following description taken in conjunction with any accompanying drawings.

In a number of embodiments hereof, devices, systems and methods hereof measure, record and/or analyze actions taken by an evaluator in the process of evaluating a driver's capabilities in a vehicle.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a sensor" includes a plurality of such sensors and equivalents thereof known to those skilled in the art, and so forth, and reference to "the sensor" is a reference to one or more such sensors and equivalents thereof known to those skilled in the art, and so forth. Recitation of ranges of values herein are merely intended to serve as a shorthand method of referring individually to each separate value falling within the range. Unless otherwise indicated herein, and each separate value as well as intermediate ranges are incorporated into the specification as if it were individually recited herein. All methods described herein can be performed in any suitable order unless otherwise indicated herein or otherwise clearly contraindicated by the text.

In a number of embodiments, systems and methods hereof provide for evaluation of vehicle control by a driving entity in, for example, a dual control vehicle (that is, a vehicle having at least one secondary control for use by a professional conducting an evaluation session, whether by land, sea or air, such as an evaluator's brake actuator/pedal; dual control vehicles are referred to herein as vehicles) under observation by a professional or an evaluator. The driving entity may be a human driver and/or an automated control system or systems adapted to assist in control one or more aspects of a vehicle's operation. Although the systems and methods hereof are described herein in connection with a drive of an automobile, one skilled in the art will appreciate that the systems and methods hereof can be applied to the operation of any motorized or powered vehicle.

Driving or vehicle control capability may be viewed as the principle focus of an on-road driving assessment when providing recommendations and findings related to, for example, driver licensing. A driver is expected to be able to independently operate a vehicle and to identify risks/hazards/obstacles. Within this expectation, driver capability reflects overall performance within an exposure of driving as well as competency in detecting road hazards and traffic laws. In essence, driving capability is the product of driving performance and driving competency. Capacity is assessed at the point where driver capability goes to zero if performance lapses in the absence of independent vehicle operation or competency declines as a result of decreased awareness in rule following. A driver's capability must remain above the demands of exposures, circumstances or situations presented within the natural environment within which they travel.

In a number of embodiments, systems and methods hereof enhance supervised driving evaluation by collection of on-road driving data for supporting evidence and context-based driver education. Within the driver rehabilitation field, this technique may, for example, translate the expertise of a driver rehabilitation specialist into sensor data patterns, which create a standard of evidence-based practice for assessing driver capability. The systems and methods hereof may, for example, accommodate measures on all road types, in any weather conditions, and during an entire on-road driving session (for example, an hour or more). Combining the findings across driver rehabilitation programs may, for example, facilitate a discussion of which kinds of errors determine driver capability and the proper thresholds for measuring safety. Systems and methods hereof may, for example, unite crash risk with the rules of the road in driving assessment by tracking interventions of the driving evaluator or Certified Driver Rehabilitation Specialist or CDRS. In a number of embodiments, methodologies hereof may, for example, encompass fundamental principles of adaptive robotics or for the design of robotic systems tuned to augment human capability (for example, to be context-aware and person-aware for technology to adapt to the demands of the user).

Intelligent Transport Systems or ITS in vehicles may, for example, be turned on or available at all times, but clinical visits may require more sophistication to identify the data corresponding to specific clients. ITS is intended to improve transportation safety and mobility and enhance productivity by integrating advanced communication technologies and sensing/sensors into vehicles and infrastructure. Data from systems hereof may, for example, be divided or segmented according to times when the client is driving the vehicle (see, for example, FIG. 1A). Driving evaluation is not always a testing scenario. Thus, there may also be a need to divide or segment data according to when the client is actually being evaluated, when instructions are being given or training is taking place (versus, for example, when the vehicle is stopped, or placed in a parked state). In general, measures of driver safety or performance should be taken in a manner such that algorithms do not skew estimates of an individual's driving capability.

Furthermore, there is a possibility to enhance the data for contextual interpretation and categorization of error types as a result of the presence of a CDRS. In a number of embodiments, two or more modes of event detection may be present. The event detection of awareness allows for CDRS-witnessed errors to be flagged in time with an illegal event log. For example, a physical button could be pressed when a client commits an error (for example, runs a stop sign at an empty intersection). Although there may be no risk of harm or collision, such a driving maneuver is clearly unsafe and illegal. Conversely, certain events coincide with or lead towards the risk of an accident or collision. In such a scenario, a CDRS may first ensure the safety of the client, their own life, and the program vehicle. Automatic event detection is very desirable under this scenario to log the occurrence of an uncontrolled event. CDRS-assisted driving events, such as steering, braking, or verbal cues, are targets of this class of event detection. Driving capability is evaluated by CDRS-witnessed driving events to assess a driver's awareness and CDRS-assisted (vehicle-witnessed) driving events to assess independent control.

Figure 1B:
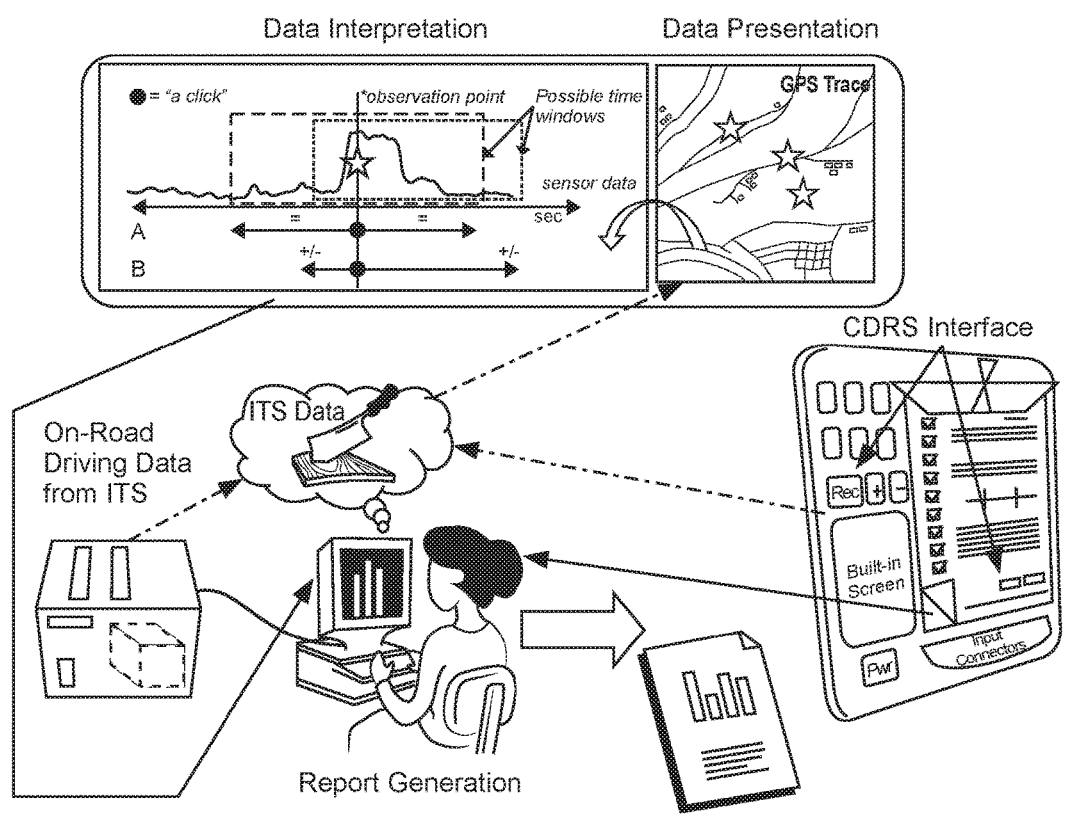
FIG. 1B illustrates an embodiment of a model for data processing, presentation, interpretation and reporting.

The complement of segmentation and enhancement markers with ITS-based on-road driving data provides an avenue to document evidence supporting clinical findings and recommendations within program reports. Typically, paper-based checklists and narratives are the standard documentation technique for reporting comprehensive evaluations. Few driver rehabilitation specialists currently utilize technology to measure driving performance on the road. Given an added CDRS logging interface, the methods and systems hereof unlock the potential of ITS data collection for clinical use. FIG. 1B, for example, includes an image from the DriveCap system (a low-cost, easily installable suite of vehicle-based sensors for study of driver capability developed at Carnegie Mellon University) to represent the integration of any ITS solution for data collection. With a robust routine for time synchronization, markers of the systems hereof may, for example, direct the display of acquired on-road driving data to key points of interest within the navigated path of the driving evaluation session. A CDRS may annotate data plots or tables that support the program findings and recommendations, and the interpretations of on-road driving data promote evidence-based practice for driver rehabilitation. While variations among CDRS-witnessed driving events may make comparisons between programs more challenging, the logging of CDRS-assisted driving events will more clearly reflect scenarios in which CDRS engagement is necessary to avoid a collision.

General algorithms can make use of various data sources to generate automatic report data that is consistently required for internal and client records of a driver evaluation/rehabilitation program. Recommendations for clients may, for example, address driving evaluation exposures, capability, performance, and driver fitness recommendations. The exposure measures may, for example, specify the driving maneuvers performed, road types traveled during assessment, and total time spent on the road. Capability and performance reporting may include rates of independent vehicle control and counts of assisted driving events along with quality measures regarding speed control, distance management, and general smoothness of driving maneuvers. Recommendations on driver fitness may, for example, relate back to clinical measures indicating functional performance capabilities/impairments and highlight areas of weakness in driving maneuvers based on exposures, plus capability or performance measures. Such an approach may facilitate the recommendation for a client to resume driving, continue with training/remediation, or transition to alternative transportation modes with driver cessation. When faced with a client's resistance to driver cessation, a driver rehabilitation specialist may benefit from having objective data to reinforce their licensing recommendation.

The driving assessment methodologies hereof have broad applications and many benefits when, for example, viewed as a tool to improve relationships during the decision making process of whether or not to drive. As an evaluator- or witness-based methodology, the scope reaches to any setting where a witness evaluates driving capability or performance. Targets for application of the methodologies hereof include physician-patient relationships, CDRS-client relationships, DMV-driver relationships, parent-child relationships (new drivers), and child-parent relationships (experienced/older drivers).

Methodologies hereof may also facilitate advancement towards a CDRS standard for driving assessment by, for example, establishing a consensus for vehicle sensor data patterns correlating to capability and performance ratings. Given such a standard, one could potentially pursue automated driver screening that is blind to age, gender, or social status. Standards may imply context-based, longitudinal evaluation of driving capability. Ultimately, the wealth of context-aware on-road driving data should also provide a common platform for interdisciplinary researchers and policy/safety experts to generate greater advocacy and policy recommendations.

The automobile industry has recently developed intelligent car electronics with information service features. The wiring connection of electrical components and cost of overall vehicle manufacturing has grown to produce greater in-vehicle networks for data communications. With this growth trend and such new capabilities, driving data collection has become popular. These efforts present a new complement of data to prior studies that were only possible using driving simulators. However, continuous video feeds and other continuous data collection processes present massive data sets which require many hours of review by researchers to determine causal factors for dangerous or "near crash" incidents "in the wild" or on real roads. The methodologies hereof may focus on the scenario of supervised driving evaluation as an avenue to real-time observation of near crash events and expert annotation related to causality and fault. The systems and methods hereof are well suited for "in the wild" data collection in uncontrolled environments such as on public roads. At the same time, the systems and methods hereof are also well suited for use in controlled environments such as closed-course test tracks or driving/operating simulators.

The most popular data collection systems for motorized vehicles are event data recorders or EDRs, which capture information about events including air bag deployment and seat belt use during a motor vehicle collision. For continuous data collection, many cars have incorporated In Vehicle Data Recorder or IVDRs. The promise of the technology has prompted a call for mandating collision avoidance technology. While EDR and IVDR systems collect data within the vehicle, intelligent vehicles have extended their computing power into the surrounding environment. This level of technology involves "connected vehicle" systems known as vehicle-to-vehicle (V2V), vehicle-to-infrastructure (V2I) and vehicle-to-other (V2X) systems. Once again, the methodologies of the present invention represent an aspect of event detection to streamline the analysis of such continuous data collection.

The methodologies hereof may, for example, be used to determine how such technologies may be controlled and ushered into public use through adoption within driver education and training schools as well as driver rehabilitation programs. Intelligent vehicle trends may be divided into features of automation and autonomy. This differentiation allows for discussion to include features which do not present any level of autonomy associated with operation and driver interaction. Vehicle features may be classified according to their qualities of controlling decisions (autonomy) or interacting with people (automation). However, such vehicle features are referred to herein collectively as automation or automated components. Advancements in vehicle technology via automated components may be summarized as a spectrum of driver alert, driver assist, and driver switch (that is, taking over on more aspects of vehicle control by an automated component). In the field of driver rehabilitation, these terms may provide stronger connections in the way that the technologies support people with cognitive and/or physical impairments.

The transfer of increasing levels of control to an intelligent vehicle/automated component results in the differing levels of automation including, for example, the following:

Absence of assistance
Communication of insight
  offers options
  presents top options
  prompts single action
Collaborative control management
  acts upon request
  takes over when ignored
  performs unless halted
Independent driving operation
  informs driver upon request
  summons driver if needed
  disregards driver interaction (for passenger accommodation)

Various levels of driver disengagement illustrate how the demand on human input to the vehicle is reduced in response to automation of vehicle function. In this classification approach, many terms imply their benefit to avail the driver of operational tasks, although the details relate to what driving tasks occur automatically. A rule-making definition established by the National Highway Traffic Safety Administration or NHTSA sets forth five levels of automation (LOAs): no automation (LOA 0), function-specific automation (LOA 1), combined function automation (LOA 2), limited self-driving automation (LOA 3), and full self-driving automation (LOA 4) (NHTSA, 2013).

In a number of embodiments, the systems and methods hereof provide for testing or validating advanced safety systems or automated components. For example, the safety/automations system may be running in the vehicle as a simulation during evaluation of a drive. In that regards, sensor(s) of the automated component(s) of the safety system may be functioning and output of the safety system monitored, while actual control of the vehicle by the automated component(s) is deactivated. The systems and methods hereof may, for example, present a "competition" of evaluator vs. machine and harmonize the attitudes between people and automated vehicles. The methods and systems hereof may, for example, allow automotive manufactures to associate their safety systems with the trust placed in driving instructors.

As described above, data collection in the systems and methods hereof quantify assisted-driving events by a CDRS during supervised/on-road driving sessions. Individuals may, for example, be referred to a CDRS after consulting with their (primary care or specialist) physician to be prescribed the comprehensive driving evaluation service. Data collection systems hereof capture and quantify the intervention of an evaluator while on the road. The systems and methods hereof measure driver capability, defined by the actions of an evaluator, to measure the frequency and/or duration of errors as a result of functional performance, vehicular control, awareness, competency, and compliance with rules as, for example, summarized below.

a. Dependent Vehicle Operation—Assisted-Driving Event: Physical Assistance
  i. Steering Assistance: heading adjustment for positioning and redirection
  ii. Braking Assistance: speed management for deceleration and stopping b. Unsafe Driving Decisions—Assisted-Driving Event: Verbal Cues
  i. Driving Cues: verbal cues to assist with scanning, identification, and prediction
    1. notifying "right of way" determinations
    2. identifying obstacles and road hazards ahead on the driving path
  ii. Critical Cues: verbal cues to note improper decisions on driving maneuvers
    1. explaining violation of rules of the road 2. describing deficits of quality/safety in driving maneuver performance Using structured collection of on-road driving data, the data collection systems hereof enable exploration of the potential benefits from intelligent vehicles to inform driver licensing decisions. Driver evaluation vehicles may be instrumented with systems hereof so that assisted-driving events are quantifiably factored into, for example, a report informing driver licensing decisions.

As described above, in a number of embodiments, systems hereof (sometimes referred to as NAViSection system) provide for detection, documentation and/or analysis of assistance provided by a driving evaluator or evaluating individual within the context of a driving program. The system may, for example, actively monitor each time an evaluator such as a CDRS provides, for example, steering, braking and/or verbal cue assistance. Such metrics provide an indication of when driving errors present an excessive risk/traffic law violation (steering and braking assistance) or when driving decisions are a concern (verbal cues assistance). In a number of representative embodiments, the system hereof automatically documents the occurrence of steering and braking assistance, and marks verbal cues when the evaluator/CDRS activates an actuator (for example, activates a button). Alternatively, verbal cues/prompts may be automatically detected using, for example, natural language processing solutions as known in the computer and/or language processing arts.

Figure 2:
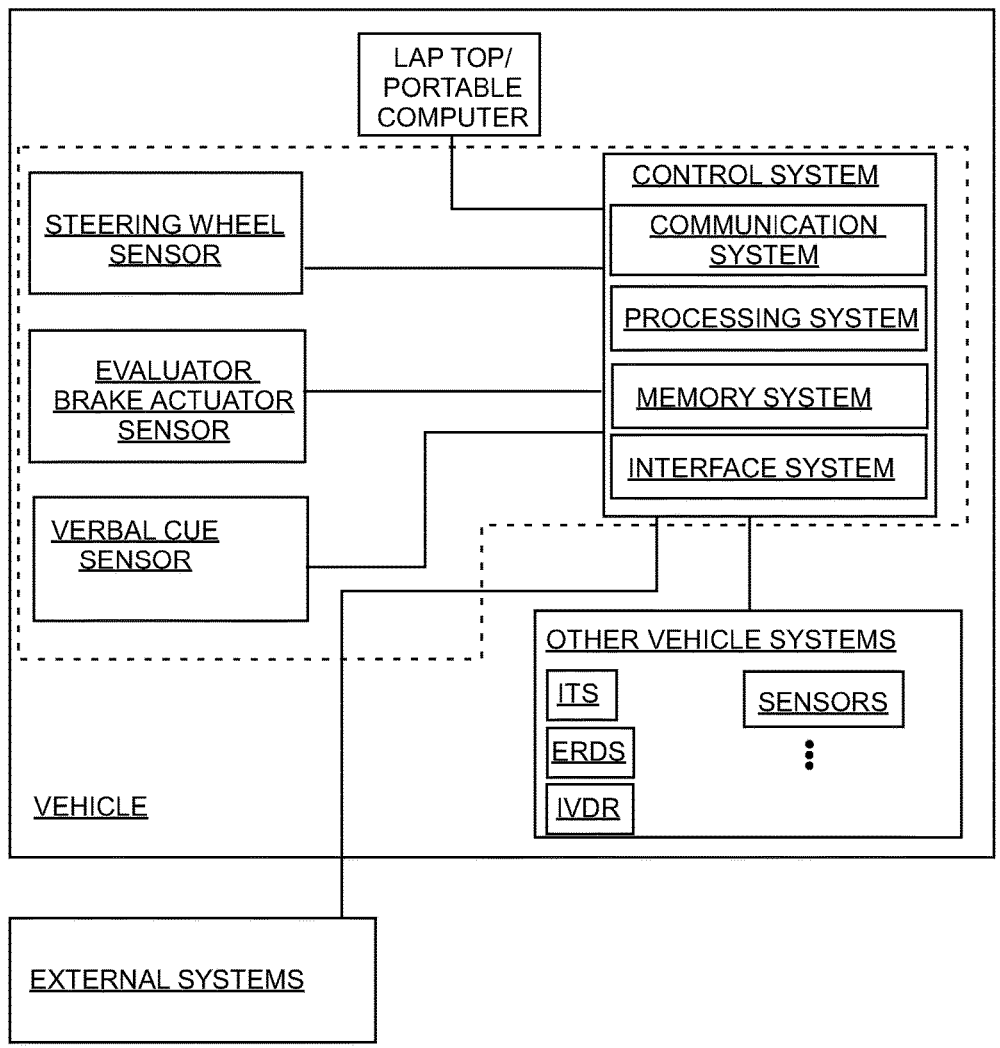
FIG. 2 illustrates a schematic representation of a system hereof.

FIG. 2 sets forth a schematic illustration of a system or NAVisection system hereof. In a number of embodiments, systems hereof include a controller or control system, a verbal cue sensor or voice assistance logging system, an evaluator brake actuator (e.g., brake pedal) sensor or interface, and a steering wheel sensor system such as a non-contact, proximity sensor system for use in connection with a steering wheel. The sensor systems hereof are readily incorporated in vehicles using aftermarket products or kits.

Figure 3:
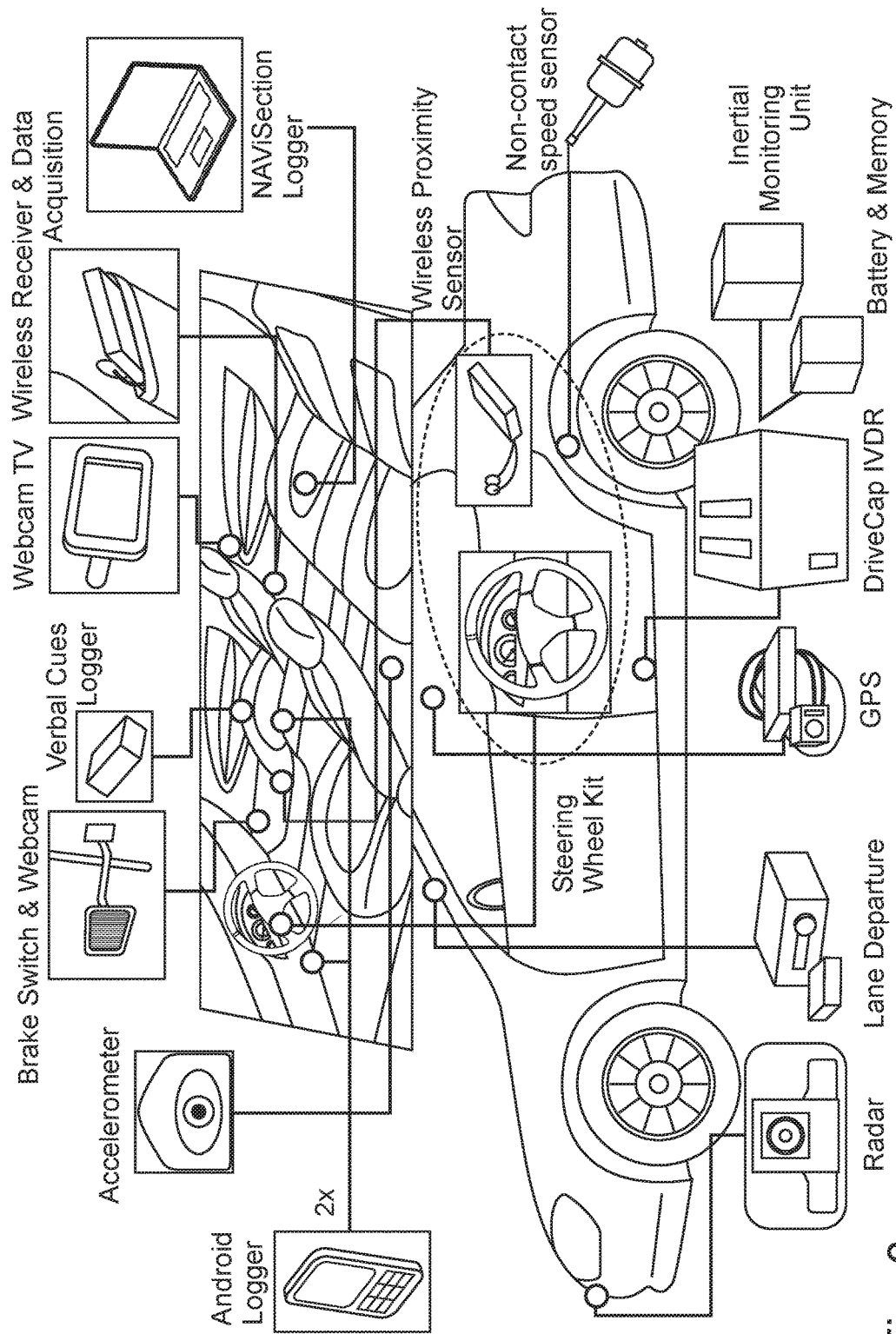
FIG. 3 illustrates a photographic representation of a system hereof and an evaluation vehicle in which the system is set up.
Figure 4:
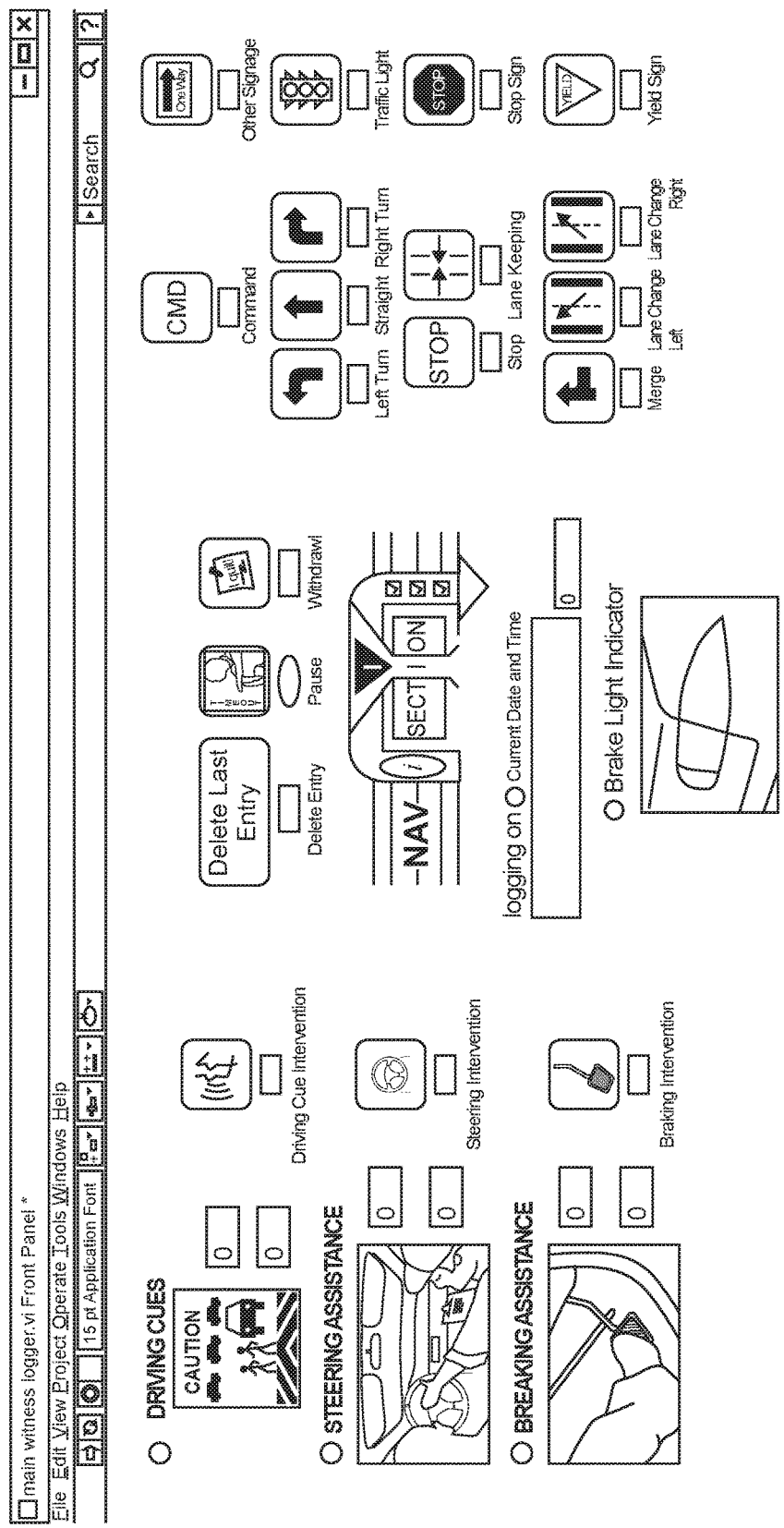
FIG. 4 illustrates an embodiment of a display screen of an interface or user interface system hereof.
Figure 5:
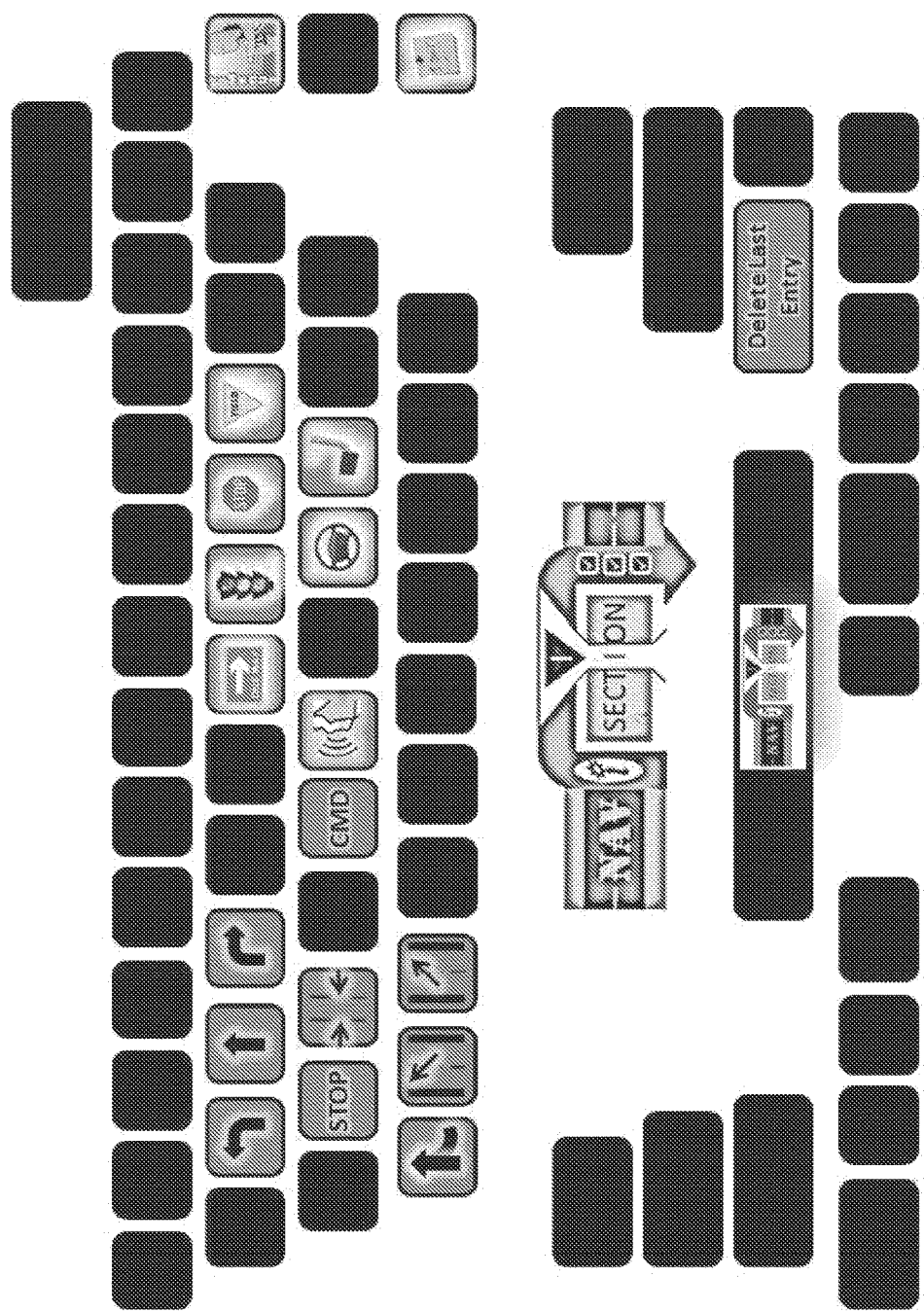
FIG. 5 illustrates an embodiment of a keyboard overlay for use in connection with a keyboard (for example of a laptop) hereof.

The control system may, for example, include or be in operative connection with an interface system including, for example, a keyboard, a mouse, a display and other input or output devices or systems. The control system may further include a processor system (for example, including one or more processors such as microprocessors) in communication with a memory system. The memory system may, for example, include one or more software algorithms embodying aspects of the systems hereof (for example, data collections algorithms, reports etc.). The control system may further include or be in operative connection with a communication system which may include wired and/or wireless communication operability. Data collected from operation of the systems hereof may be stored in the memory system. As discussed above, systems hereof may be in operative connection or communication with other on-board vehicle system such as ITS, ERDS, IVDR, GPS, individual sensors, etc. The systems hereof may also be in communication (via, for example, the communication system) with systems external to the vehicle (for example, via wireless communication). FIG. 3 provide an enhanced photograph of a vehicle and various systems hereof. FIG. 4 illustrated an example of a display, while FIG. 5 illustrates an example of a keyboard overlay for a laptop for use by an evaluator or a second evaluator/witness.

Contact or non-contact sensors may, for example, be used to detect steering wheel assistance by an evaluator. In a number of embodiments of a steering wheel assistance detections system, a sensor system was used in which the proximity of an evaluators hand to the steering wheel was detected. A number of detection modalities, such as computer vision, RF ID-based sensing, or magnetic triggering of a reed switch (or Hall Effect sensor), are suitable for detecting proximity. In a number of embodiments, a magnetic triggering approach directed the proximity-sensing ring design to operate as a contact sensor.

As, for example, illustrated in FIG. 6, a steering wheel kit 100 may, for example, include a sensor system having a component which covers a portion of or the entire perimeter of the steering wheel 200 (which may be the driver steering wheel or an evaluator steering wheel in vehicles equipped with dual steering wheels). In a number of embodiments, proximity sensor system of steering wheel kit 100 includes a plurality of magnets 130 fixed within brackets. The brackets may, for example, align the magnets to orient a trigger field, which is tuned for contact at the perimeter of steering wheel 200 and a predefined interaction space within the steering wheel volume. Such an embodiment provides a trigger field without use of power or any wiring on steering wheel 200. A commercially available steering wheel cover 150 may, for example, cover magnets/brackets 130 for comfort of the driver.

In a number of embodiments, the proximity sensors are, for example, reed switches 160 worn in the vicinity of or on the evaluator's hand, which may, for example, be embedded within a glove or within enclosures fashioned as rings. The rings may, for example, use an elastic band attachment and have wires extending to a wrist pack 170 to be worn by the evaluating individual. A circuit board 171 with a transmitter such as an FM transmitter/transceiver 172 and a battery pack 174 within the wrist pack 170 may, for example, facilitate data transmission from the evaluating individual's hand. Such a system offers an untethered data collection capability that isolates the contact of the evaluator's hand on steering wheel 200 from the driver's hands. An FM receiver/transceiver may, for example, reside on a circuit board of the communication system of the control system, which may, for example, be placed in the back seat of the evaluation vehicle.

The circuit board of the control system may, for example, be wired directly into a data acquisition system such as a NATIONAL INSTRUMENTS™ Data Acquisition Box (NI DAQ box) available from National Instruments Corporation of Austin Tex. In general, data acquisition or DAQ systems operate as the interface between a processor/computer and signals from the outside world. The DAQ system may, for example, functions as a device/system that digitizes incoming analog signals so that a processor/computer can interpret them. In other embodiments, sensors may output digital signals and conversion/digitization may not be required. Components of a DAQ device used for measuring a signal may include, for example, signal conditioning circuitry, an analog-to-digital converter (ADC), and/or a computer bus. DAQ devices may include other functions for automating measurement systems and processes (for example, digital-to-analog converters (DACs) output analog signals, digital I/O lines input and output digital signals, and counter/timers count and generate digital pulses). Alternative embodiments may, for example, include the use of any number of microcontroller products with wired or wireless connectivity (for example, ARDUINO (an open source electronics platform), RASBERRY PI (a credit-card sized single-board computer) and other microcontroller embodiments such as Wi-Fi, BLUETOOTH (a wireless communication standard), ZIG-BEE (a specification for communication protocols) and other wireless communication technologies.

In a number of embodiments, proximity sensor systems hereof include a first component which creates an energy field (for example, electromagnetic energy) and a second component which reacts to or senses the energy field when the second component is in a predetermined range of proximity to the first component. As described above, for example, interaction by the driving evaluator and the steering wheel may be detected when the magnetic field around the steering wheel activates reed switches embedded within a ring housing worn by the evaluator. Alternatively, a worn component can create an energy field and one or more sensors on the steering wheel can detect proximity of the worn component thereto. The status of the wireless proximity sensing rings are communicated by the circuit board including the FM receiver using an FM (radio frequency) transmitter. Power management of the circuit board may, for example, allow for modulation to function using two AAA batteries. The signals broadcast by the proximity sensing rings are captured through the FM receiver installed on a circuit board, which may be wired into the NI DAQ Box as described above. The NI DAQ box registers the signal state in one of the input channels thereof. Using, for example, power through the USB ports on a laptop, the NI DAQ box may, for example, provide a 5V power source across the input channels. A similar connection scheme may apply to the braking assistance sensor system and verbal cue/assistance logging sub-systems of the NAViSection System.

Proximity sensor systems as described above may, for example, be used in many situations in which it desirable to determine proximity of a person to one or more items or locations. For example, proximity sensor systems hereof may be used as risk exposure systems (such as, for example, pinch points, sharp-edged surfaces etc. in manufacturing and other facilities). In that regard, an employee or operator may wear a first component of the proximity sensing system (for example, an energy sensor) and a second component of the proximity sensing system (for example, which creates an energy field such as an electromagnetic energy field) may be placed in vicinity to or on the item of location for which proximity is to be sensed. The proximity sensor systems hereof may, for example, be used in many fields including, for example, public health, epidemiology, and occupational safety. They may, for example, find use in workplace safety audits for compliance with proper occupational performance guidelines in environments including but not limited to, theater and stage setup environments, stored energy keep-out zones in plants/facility environments, high temperature burn risk environments, and pinch-point and/or sharp-edge surface environments.

Braking assistance sensor system 300 (illustrated schematically in FIG. 7) hereof may, for example, include a roller-ball switch with interface and mounting brackets in operative connection with a commercially-installed evaluator brake actuator/pedal 400. Braking assistance sensor systems hereof are readily retrofitted on evaluator brake systems. A commercially available switch with a roller-ball interface may, for example, be added to the evaluator brake, which is previously installed in the driving program's evaluation vehicle. In a number of embodiments, a bracket was used to fix the switch in space relative to the brake's frame, and the switch engaged with movement of the brake pedal via a striking surface applied on the cable pulley of the brake. The selection of a mounting location may, for example, target a position that would not be at risk of a kick-strike as the evaluator or any passenger enters or exits the evaluation vehicle. In a number of embodiments, a striking plate surface interfaced with the brake cable pulley via the head of a bolt tightened by an Allen wrench. A press-fit sizing on the hex-shaped protrusion provided an adequate grip to secure the striking plate to the pulley fixed to the brake pedal. In a number of embodiments, brake assistance sensor system 300 included a wired connection to the data acquisition box as described above, which was concealed under floor mats along the floorboard of the evaluation vehicle.

A controller 500 (illustrated schematically in FIG. 8), which may be used for initiating verbal cue logging, may, for example, include a circuit board 510 with a switch or switches 520, such as instantaneous buttons, and a number of indicators 530 such as LEDs providing positive feedback (for example, of when the NAViSection System is recording (Power On) and if a verbal cue was logged by, for example, actuation of a button to initiate voice recording—for example, via a microphone system). Sensors such as switches used in the braking sensor system and the controller system, which may be used for initiating verbal cue logging, may, for example, be wired in directly to the NI DAQ box. Alternatively, wireless data transmission may be used (as, for example, described above in connection with the steering wheel sensor system). Controller 500 and circuit board 510 thereof for the driving evaluator provides a mechanism to start and stop data collection via the associated software routine(s). The controller system may be readily designed to allow for integration with many surfaces or locations within the vehicle cabin or even on the driving evaluator's body.

In a number of embodiments, software development utilized the signals collected through the NI DAQ box using LABVIEW™ software available from National Instruments Corporation. As described above, all sensors were wired directly into the NI DAQ box excluding the proximity sensing rings (in which wireless data transmission was used as described above). The data were recorded via a testing laptop in operative connection with the NI DAQ box into a data file for future analysis. The LABVIEW routine created the file name using, for example, the date and time when the run command was given. In a number of studies, when a driving session was starting, the CDRS switched the recording routine on via the controller system. The controller system, proximity sensing rings, brake switch and testing laptop keyboard provided inputs to the data file. This file contained the LABVIEW timestamp format and a translation to Unix epoch time (Unix timestamp). A standard coding block (that is, virtual instrument) read the inputs from the NI DAQ box for all input devices other than the keyboard for the laptop.

A number of metrics of NAViSection had, for example, independent, Boolean case structures to document activation of a switch for steering assistance, braking assistance, or verbal cues assistance. In a number of embodiments, the true case structure sustained or reset the values for count and duration respectively, while the false case structure incremented the variables by one count or continuously for every tenth of a second. A nested Boolean case structure facilitated the increments for the duration value when the source signal remained on for over 100 milliseconds.

Verification of the NAViSection System may, for example, involve inputs from an observer during driving sessions, and the testing metrics may be entered via a laptop keyboard as described above. In a number of embodiments, all assigned keys were tracked by a separate virtual instrument and linked to individual, Boolean case structures as used for the NI DAQ box inputs. One key had the ability to pause the data collection routine if the CDRS had the driver pull over on the side of the road for instructions on how to improve driving behaviors. A separate key was assigned to end recording and end the LABVIEW routine.

Figure 9:
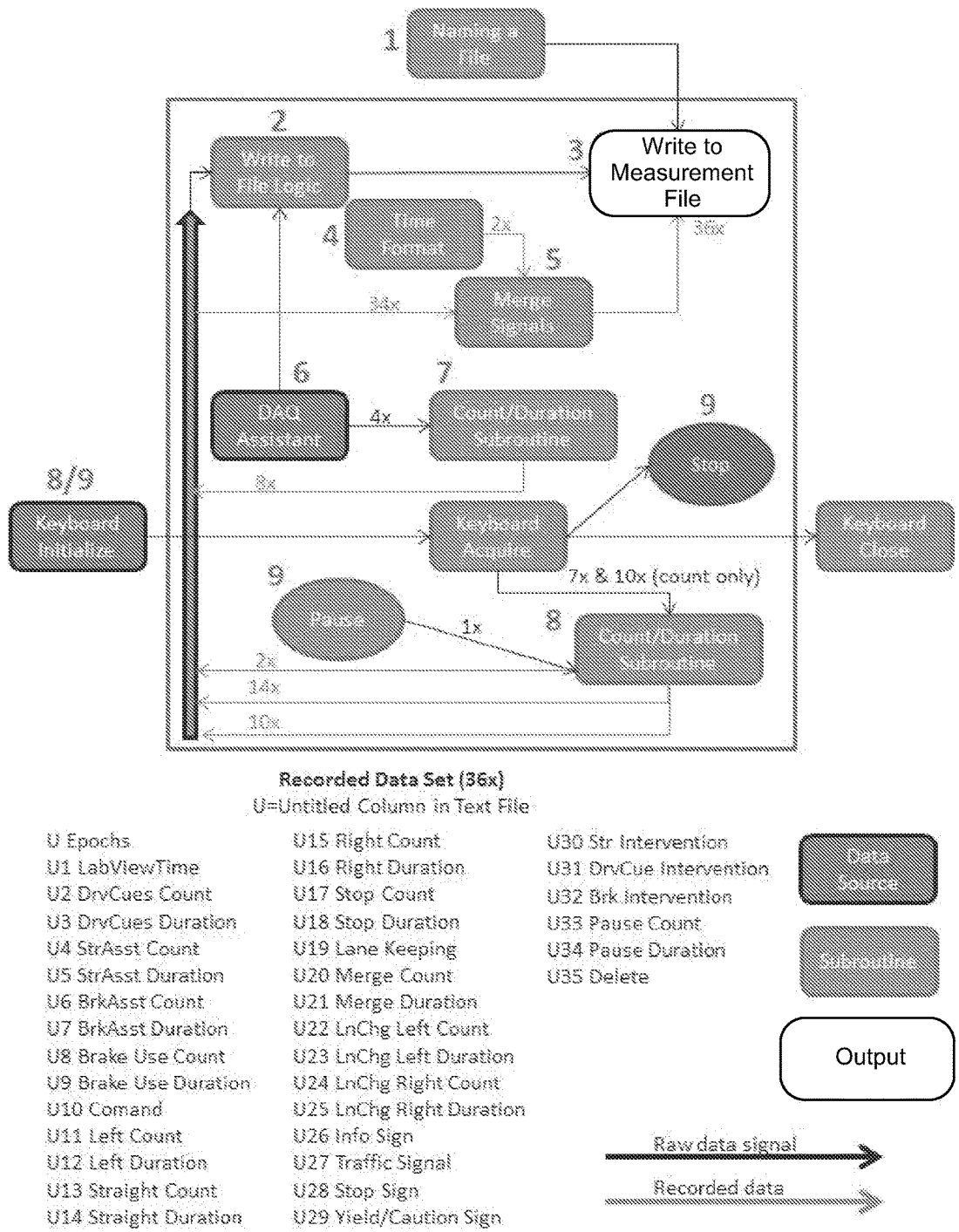
FIG. 9 illustrates a representative example of a map of LABVIEW virtual instruments providing an example of how data was collected.

Data recording followed a logic structure that required the controller system to be switched on and the pause key from the keyboard to be toggled off. There also needed to be an active signal across any of the signals monitored across the DAQ box or keyboard. Unless all three conditions were met, there was no data recorded. The "Build Table" virtual instrument ordered the channels of data with the "merge signals" virtual instrument. The file name, data recording logic status, and build table output combined into the "Write to Measurement File" virtual instrument, which produced a text file with 35 columns of data produced over the duration of a driving session at the Adaptive Driving Program. FIG. 9 illustrates an example of a map of LABVIEW virtual instruments providing an example of how data was collected. The map of the routine illustrates how elements build up the data collection routine with a list of all data channels recorded into text files. FIG. 9 further sets forth the 35 columns of data produced over the duration of a driving session in a number of embodiments hereof.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A system for evaluation of an operator of a vehicle under observation of an evaluator within the vehicle, the vehicle comprising a steering system, the system comprising: a steering sensor system adapted to measure intervention of the evaluator in operating the steering system.

2. The system of claim 1 wherein the vehicle further comprises at least one secondary control system via which the evaluator may intervene in control of the vehicle and the system further comprises a secondary control sensor system to measure intervention of the evaluator via the at least one secondary control system.

3. The system of claim 2 wherein the vehicle further comprises a braking system, and wherein the secondary control system comprises an evaluator brake actuator in operative connection with the braking system, and the secondary control sensor system comprises a braking sensor system in operative connection with the evaluator brake actuator which is adapted to measure intervention of the evaluator in operating the evaluator brake actuator.

4. The system of claim 3 further comprising a verbal cue logging system via which verbal cues from the evaluator to the operator are logged.

5. The system of claim 4 wherein the verbal cue logging system is activatable by the evaluator.

6. The system of claim 4 further comprising a control system in operative connection with the steering sensor system and the braking sensor system.

7. The system of claim 6 wherein the control system comprises a controller in operative connection with the verbal cue logging system which comprises at least one activatable switch to activate the verbal cue logging system.

8. The system of claim 6 further comprising a data acquisition system in operative connection with the steering sensor system, the braking sensor system and the verbal cue logging system.

9. The system of claim 8 further comprising a processor in communicative connection with the data acquisition system.

10. The system of claim 8 wherein the steering sensor system detects proximity of an evaluator's hand to the steering wheel.

11. The system of claim 10 wherein the steeling sensor system comprises a steering wheel component and an evaluator component which is worn in vicinity of the evaluator's hand.

12. The system of claim 11 wherein at least one of the steering wheel component and the evaluator component creates an energy field.

13. The system of claim 12 wherein at least one of the steering wheel component and the evaluator component comprises at least one magnet to create a magnetic field in the vicinity thereof, and the other of the steering wheel component and the evaluator component comprises a sensor reactive to the magnetic field.

14. The system of claim 12 wherein the evaluator component is in wireless communicative connection with the data acquisition system.

15. A system for evaluation of a vehicle operator in a vehicle under observation of an evaluator in the vehicle, comprising: at least one sensor system to measure intervention of the evaluator in operating vehicle.

16. The system of claim 15 wherein the vehicle comprises a braking system comprising a driver brake actuator and an evaluator brake actuator, the system further comprising a braking sensor system in operative connection with the evaluator brake actuator which is adapted to measure intervention of the evaluator in operating the evaluator brake actuator.

17. The system of claim 16 wherein the vehicle comprises a steering system, and the system further comprises a steering sensor system adapted to measure intervention of the evaluator in operating the steering system.

18. A method for evaluating vehicle control of a human driver of a vehicle under observation of a human evaluator in the vehicle, comprising: providing at least one sensor system adapted to measure intervention of the human evaluator in operating the vehicle.

19. The method of claim 18 wherein the vehicle comprises a steering system, the method comprising providing a steering sensor system adapted to measure intervention of the human evaluator in operating the steering system.

20. The method of claim 19 wherein the vehicle further comprises a braking system comprising an evaluator brake actuator, the method further comprising providing a braking sensor system in operative connection with the evaluator brake actuator which is adapted to measure intervention of the human evaluator in operating the evaluator brake actuator.

21. The method of claim 20 further comprising providing a system to log verbal cues given by the human evaluator.

22. The method of claim 21 further comprising providing a data acquisition system in operative connection with the steering sensor system, the braking sensor system and the verbal cue logging system.

23. The method of claim 22 wherein the vehicle further comprises at least one automated component, the method further comprising monitoring an output of the at least one automated component and comparing of the output with data from the data acquisition system to evaluate the at least one automated component.

24. The method of claim 18 wherein the vehicle further comprises at least one automated component, the method further comprising monitoring an output of the at least one automated component and comparison of the output with data of evaluator intervention to evaluate the at least one automated component.

* * * * *